United States Patent [19]

Barnes

[11] Patent Number: 4,972,625

[45] Date of Patent: Nov. 27, 1990

[54] TACKLE HOLDER

[76] Inventor: Robert R. Barnes, 10735 W. 26th Ave., Denver, Colo. 80215

[21] Appl. No.: 409,608

[22] Filed: Sep. 18, 1989

[51] Int. Cl.$^5$ .............................................. A01K 97/06
[52] U.S. Cl. ...................................... 43/57.1; 43/54.1; 206/315.11
[58] Field of Search .............................. 43/54.1, 57.1; 206/315.11

[56] References Cited

U.S. PATENT DOCUMENTS

| | | | |
|---|---|---|---|
| 2,220,817 | 11/1940 | Holmes | 43/57.1 |
| 2,711,050 | 6/1955 | McIntyre | 43/57.1 |
| 3,350,810 | 11/1967 | Warner | 43/57.1 |
| 3,780,468 | 12/1973 | Maffett | 43/54.1 |
| 3,797,161 | 3/1974 | Smallwood . | |
| 4,006,553 | 2/1977 | Porter | 43/54.1 |
| 4,208,825 | 6/1980 | Barnes . | |
| 4,589,546 | 5/1986 | Sunderland | 43/57.1 |
| 4,729,474 | 3/1988 | Lanius | 43/54.1 |
| 4,756,412 | 7/1988 | Graves | 43/57.1 |
| 4,768,651 | 9/1988 | Lanius | 206/315.11 |
| 4,782,619 | 11/1988 | Richards | 43/57.1 |
| 4,813,173 | 3/1989 | Abbotoy | 43/57.1 |

Primary Examiner—Kurt Rowan
Attorney, Agent, or Firm—Fields, Lewis, Pittenger & Rost

[57] ABSTRACT

A tackle holder for fishing tackle such as fishing lures or the like. The tackle holder includes a base portion and a tackle storage structure comprised of a plurality of tackle storage cells for individually retaining and storing the fishing lures. The tackle storage cells are formed by a plurality of corrugated partitions movably mounted to the base portion and aligned in opposite mirror image pairs. The fishing lures are suspended by their hooks on the partitions with each lure contained within an individual storage cell. Hook retaining means and a cover may be provided for closing the storage cells and for retaining the lures within the cells. An alternative embodiment is an open framework supporting the partitions. This is inserted into a compartment of a larger fishing tackle box.

26 Claims, 5 Drawing Sheets

TACKLE HOLDER

TECHNICAL FIELD

This invention relates to holders for fishing tackle and more particularly to tackle holders suited to carrying tackle such as fishing lures having single or multiple hooks.

BACKGROUND ART

Fishing lures and other fishing tackle come in a variety of shapes and sizes. In general, fishing lures are formed with one or more barbed hooks. A problem with fishing lures is that when they are stored or carried together or with other tackle, the hooks on the lures tend to become entangled and hooked to one another and to the other tackle. This is especially true in lures and tackle having treble hooks and multiple hooks along the lure body. In the past, tackle boxes having rows of horizontal drawers, one for each lure, have been utilized. This type of tackle box is effective but requires the box to be relatively large and expensive.

Other tackle boxes, such as those disclosed in U.S. Pat. No. 3,797,161 to Smallwood and U.S. Pat. No. 4,208,825 to Barnes, disclose arrangements in which the lures are suspended by their hooks from the vertical walls of a tackle box. While these tackle boxes function to maintain separation of the lures at the point of a hook's attachment to the wall, in general the bodies of the lures and the remaining hooks are not separated and may still interact with one another and become entangled. This is especially true if the tackle box is dropped or excessively jostled during transport.

The present invention is directed to a tackle holder that overcomes these prior art disadvantages by providing individual or separate storage cells for each lure.

DISCLOSURE OF THE INVENTION

In general, the tackle holder of the present invention has a base portion and a storage structure that includes a plurality of individual tackle storage cells. The tackle storage cells are formed by a plurality of movably mounted wave shaped or corrugated partitions arranged side by side in opposite pairs which are mirror images of one another. In use, each lure or other tackle item can be attached to the top edge of a corrugated partition and separately retained in an individual storage cell.

Each corrugated partition includes mounting means that engage guide rails on the base portion and movably mount and align the partitions with respect to one another. In use, each corrugated partition may be selectively moved from a closed position in which adjacent partitions abut one another and the individual tackle storage cells therebetween are closed, to an open position in which the individual tackle storage cells between two partitions are open for viewing and selectively removing the lures or other tackle attached to a partition. In addition, stop means is provided as part of the base portion for limiting the movement of each partition within the base portion.

The base portion may be formed as a closed box-like container with a cover for covering the storage structure. Alternately, the base portion may be formed as an open framework for use in combination with a larger tackle box. Additionally, hook retaining means may be provided for attaching the hooks of each lure to a partition.

The tackle holder of the invention thus provides individual tackle storage cells for storing and maintaining separation of a plurality of fishing lures or other tackle. Each movable partition may be individually moved or readily removed from the tackle holder with the lures attached for viewing and removing the fishing lures in a storage cell and on a partition.

BRIEF DESCRIPTION OF THE DRAWINGS

Further details and advantages of the invention will be apparent from the following specification and accompanying drawing in which like parts bear similar reference numerals and in which.

DETAILED DESCRIPTION

Figure 1:
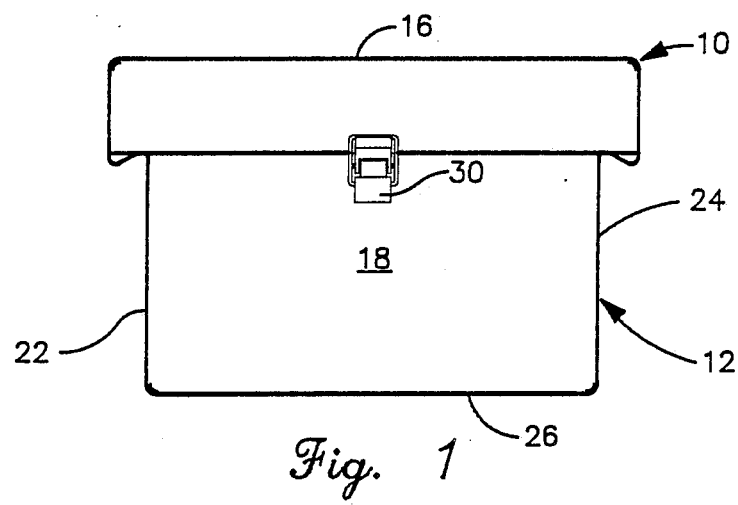
FIG. 1 is a front elevation view of the outside of a closed tackle holder embodying features of the present invention.
Figure 2:
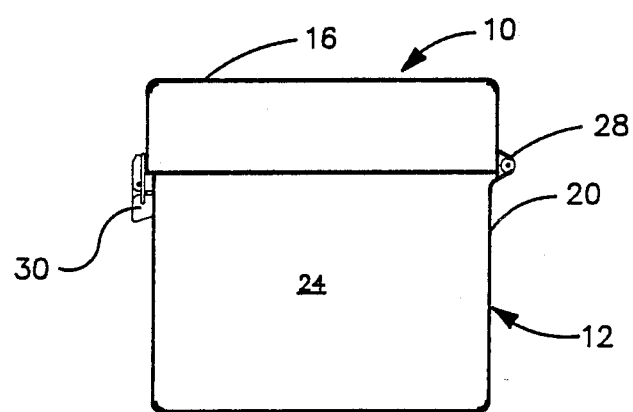
FIG. 2 is a side elevation view of FIG. 1.
Figure 3:
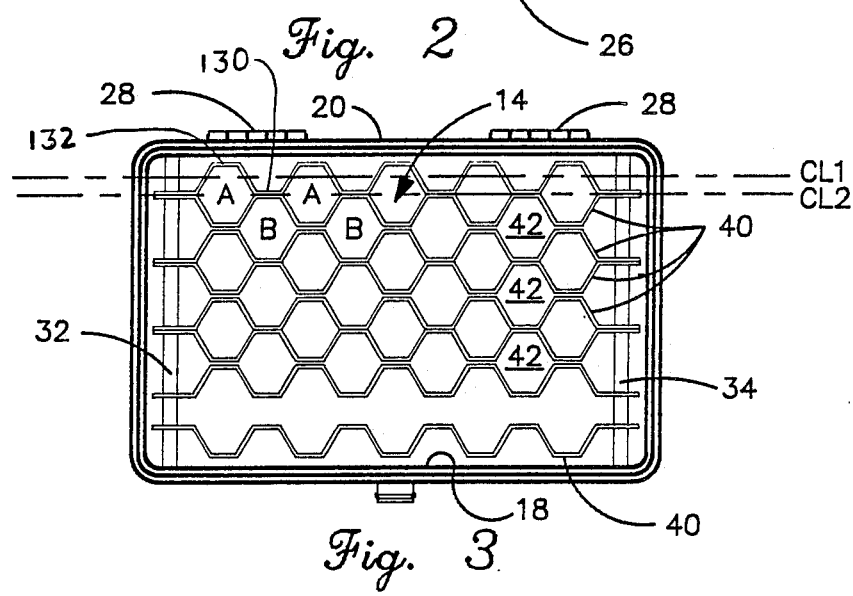
FIG. 3 is a top plan view with the cover removed of a tackle holder embodying features of the present invention.

Referring now to FIGS. 1-7, a tackle holder constructed in accordance with the invention is shown and generally designated as 10. The tackle holder 10 shown generally stated comprises a base portion 12 and a storage section 14 (FIG. 3).

Figure 14:
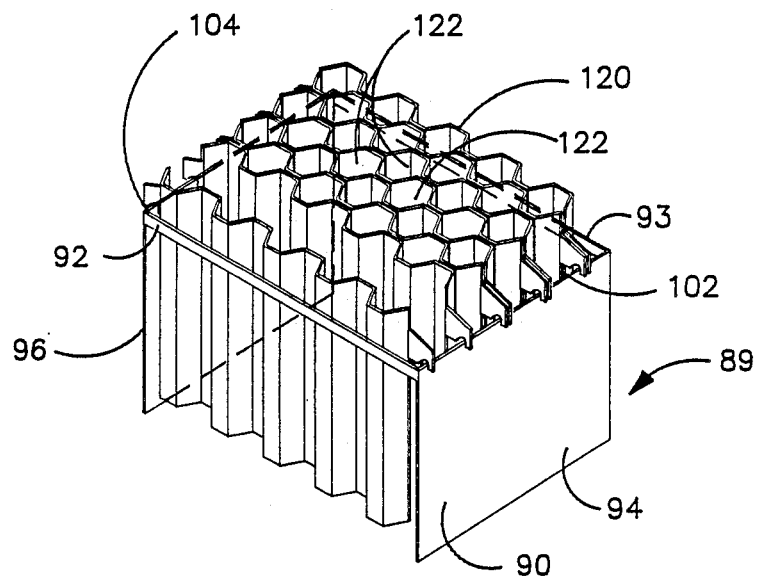
FIG. 14 is a perspective view of a tackle holder constructed in accordance with an alternate embodiment of the invention using an open framework.

In the embodiment of the invention illustrated in FIGS. 1-7, the base portion 12 is a box-like container having a hinged cover 16 which may be opened or closed over the storage section 14. Alternately, as will hereinafter be explained, the base portion 12 may be constructed as shown in FIG. 14 as an open frame-like structure with no cover that is intended for use with a larger tackle box.

In the embodiment shown in FIGS. 1-7 the base portion 12 includes a front wall 18, a rear wall 20, sidewalls 22 and 24 and a bottom 26 that form a box-like container that is open at the top and selectively closed by cover 16. The base portion 12 may be formed from a rigid lightweight material such as molded plastic.

Figure 6:
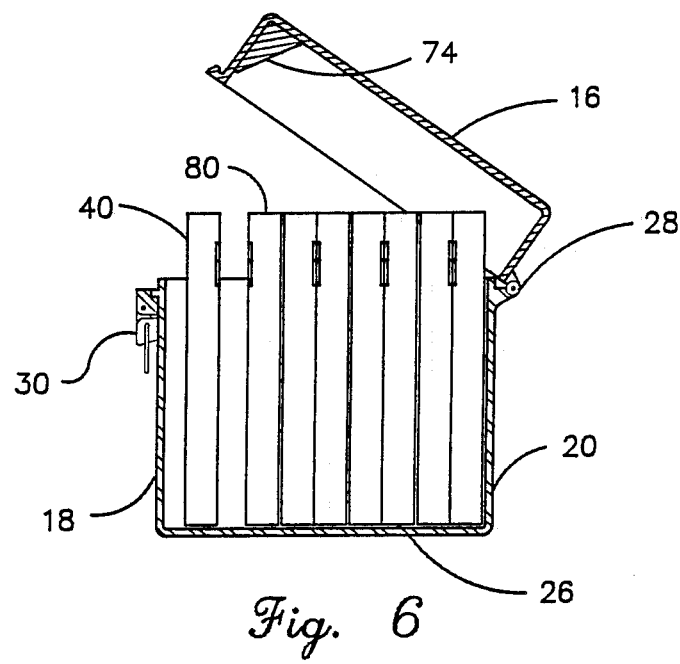
FIG. 6 is a cross sectional side elevation view of the tackle holder embodying features of the present invention with the front partition and the cover in an open position.
Figure 7:
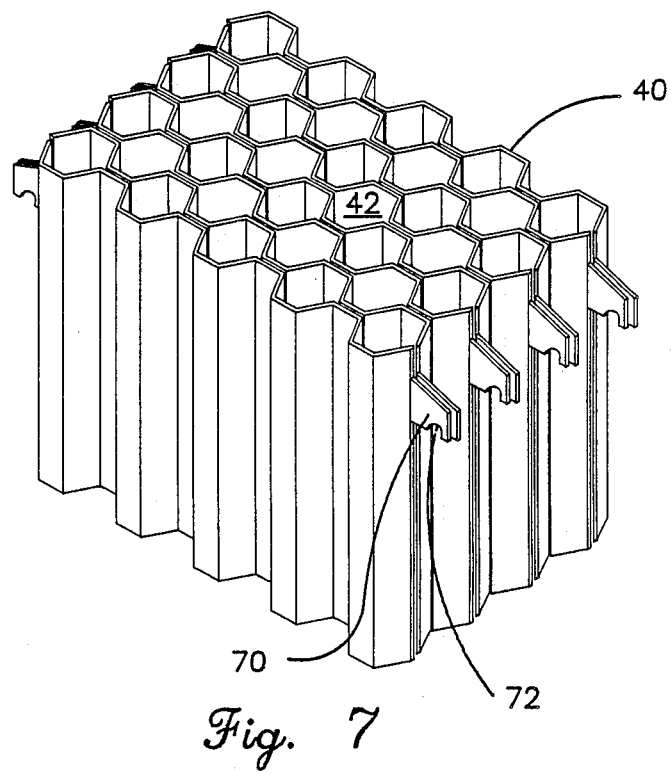
FIG. 7 is a perspective view (with parts removed) of the corrugated partitions defining storage cell structure of a tackle holder embodying features of the present invention with all of the corrugated partitions shown in a closed abutting position.

The hinged cover 16 is hingedly attached to the rear wall 20 of the base portion 12 by a pair of hinges 28. The hinged cover 16 is movable from a closed position as shown in FIGS. 1 and 2 or to a particular open position as shown in FIG. 6 and may be pivoted further to a fully open position fully exposing the storage section. The base portion 12 further includes a latch 30 for securing the hinged cover 16 in a closed position.

Figure 4:
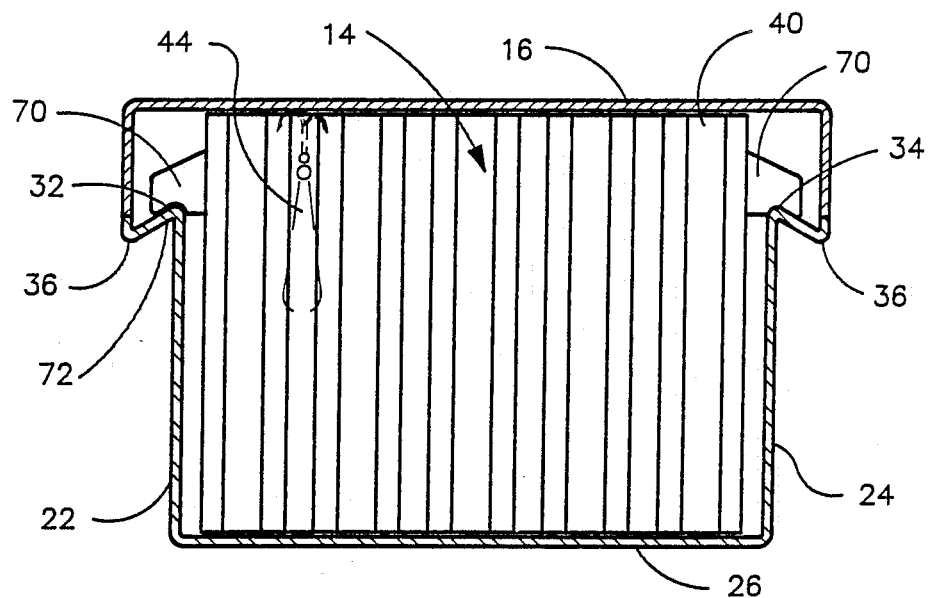
FIG. 4 is a cross sectional front elevation view of a tackle holder embodying features of the present invention with the cover in a closed position.

In addition, the base portion further includes a pair of spaced parallel siderails 32, 34, FIG. 4, on which is mounted the storage section 14 of the tackle holder 10. As shown in FIG. 4, the siderails 32, 34 may be formed or molded as the top edge of the side walls 22, 24 of the base portion 12. The top edges of the siderails 32, 34 are formed with a radiused convex surface, which as will hereinafter be explained, engages a mating radiused concave surface of the mounting means for the storage section 14.

Finally, the base portion 12 further includes a laterally and downwardly extending overhanging flange portion 36 with an outer upturned lip portion 37 (FIG. 4) integrally formed or molded to the outside of and at the top of the sidewalls 22, 24 of the base portion 12 and to the front wall 18 to receive and support the hinged cover 16. The lip portion 37 can be sized and shaped to exactly conform to the peripheral dimensions of the hinged cover 16 to provide a mating surface for the cover 16 when it is closed. Additionally, the cover and lip portion 37 is sized to provide clearance or gap 38 for the storage section 14 within the box like base portion 12. This gap 38 is selected in the form shown in FIG. 8 so that a hook 39 is compressed between the cover and the top edge 80 of the portion to hold the hook and an associated lure in the cell. The flange portion 36 also provides a pick up handle by which the base portion 12 can be handled and lifted.

Referring again to FIG. 3, the storage section 14 of the tackle holder 10 is shown. The storage section 14, in general, comprises a plurality of wave shaped or corrugated partitions 40 disposed side by side and shown movably arranged in opposite mirror image pairs to form a plurality of rows A,B of individual tackle storage cells. The opposite pairs of partitions 40 are identical in construction with one another with on of each pair turned end for end and facing in an opposite direction with respect to the other of each pair so as to be a mirror image of the other.

Each corrugated partition 40 is individually movably mounted on the siderails 32, 34 of the base portion 12. Each corrugated partition 40 is sized such that the corrugated partitions 40 can be placed within the box-like base portion 12 with an overall length that approximates but is slightly greater than the distance between the siderails 32, 34 of the base portion 12. Additionally, as shown in FIG. 4, each partition 40 is sized such that the depth of the tackle storage cells 42 formed between the corrugated partitions 40 is greater than the length of a typical fishing lure 44 or other fishing tackle. The lures 44 or other tackle as will hereinafter be explained, may thus be freely suspended within the tackle storage cells 42.

As shown in FIG. 3, each corrugated partition 40 is formed in a wave-like or corrugated pattern that allows rows A,B of individual tackle storage cells 42 to be formed when opposite mirror image wave patterns on an adjacent pair of corrugated partitions 40 are aligned and abutted with one another. The alternating abutment of grooves 130 and ridges 132 that project from the longitudinal center lines CL1 (FIG. 3) of the ridges 132 and grooves 130 of each of partitions 40 forms the closed storage cells 42 between adjacent abutting pairs of partitions 40. Each row A,B of tackle storage cells 42 is centered along a common longitudinal center line CL2 which is also a parting line between adjacent abutting pairs of partitions 40. Where the ridges of an abutting pair of partitions 40 extend away from one another along the longitudinal center line CL2, a row of tackle storage cells 42 are formed. Where the ridges of an adjacent abutting pair of partitions 40 extend towards one another along the parting center line CL2, the adjacent partitions abut and contact one another.

In general, each pair of abutting mirror image partitions 40 forms a row A of tackle storage cells 42 therebetween and another row B of tackle storage cells is formed between the next adjacent partition 40 that is longitudinally displaced or offset from row A. Thus three partitions 40 in series can be aligned to form two rows A,B of individual tackle storage cells 42. The middle partition 40 in the series of three partitions 40 is a mirror image of the other two partitions 40 and all three partitions are identical in construction.

In the embodiment of the invention shown in FIGS. 1-7 the corrugated partitions 40 are formed with a three-sided wave pattern that forms generally hexagonally shaped tackle storage cells 42 and a generally honeycomb-like storage structure 14. More specifically, this partition has an outer side parallel to but spaced from the longitudinal center line CL1 and two inclined sides. Alternately, corrugated partitions formed with other wave patterns can also be utilized, so long as adjacent abutting partitions are mirror images of one another and can be aligned and abutted with one another to form rows of individual cells.

Figure 8:
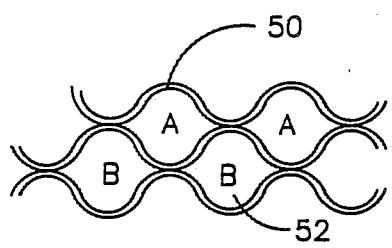
FIG. 8 is a top plan view of the storage cell structure of a tackle holder shown with the corrugated partitions constructed in an alternate embodiment having a generally semi-circular wave shape.
Figure 9:
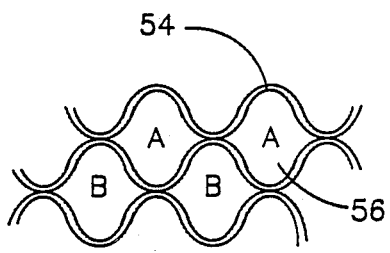
FIG. 9 is a top plan view of the storage cell structure of a tackle holder shown with the corrugated partitions constructed in an alternate embodiment having a generally sinusoidal wave shape.
Figure 10:
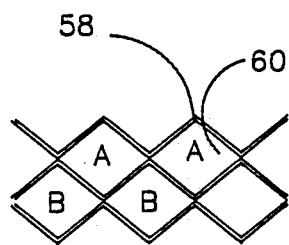
FIG. 10 is a top plan view of the storage cell structure of a tackle holder shown with the corrugated partitions constructed in an alternate embodiment and having a generally triangular wave shape.
Figure 11:
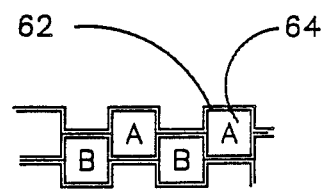
FIG. 11 is a top plan view of the storage cell structure of a tackle holder shown with the corrugated partitions constructed in an alternate embodiment having a generally square wave shape.

In the alternate embodiment shown in FIG. 8, the partitions 50 are formed with generally semicircular shaped wave patterns. This forms a row A and an offset row B of generally circular shaped tackle storage cells 52. In the alternate embodiment shown in FIG. 9 the partitions 54 are formed with generally sinusoidal shaped wave patterns. This forms a row A and an offset row B of generally double sinusoidal shaped tackle storage cells 56. In the alternate embodiment shown in FIG. 10 the partitions 58 are formed with a two-sided generally triangular shaped wave pattern. This forms a row A and an offset row B of generally double triangular shaped storage cells 60. In the alternate embodiment shown in FIG. 11 the partitions 62 are formed with a generally three sided wave pattern. This forms a row A and an offset row B of generally square shaped storage cells 64. Other shapes, such as rectangular, may be provided.

Figure 5:
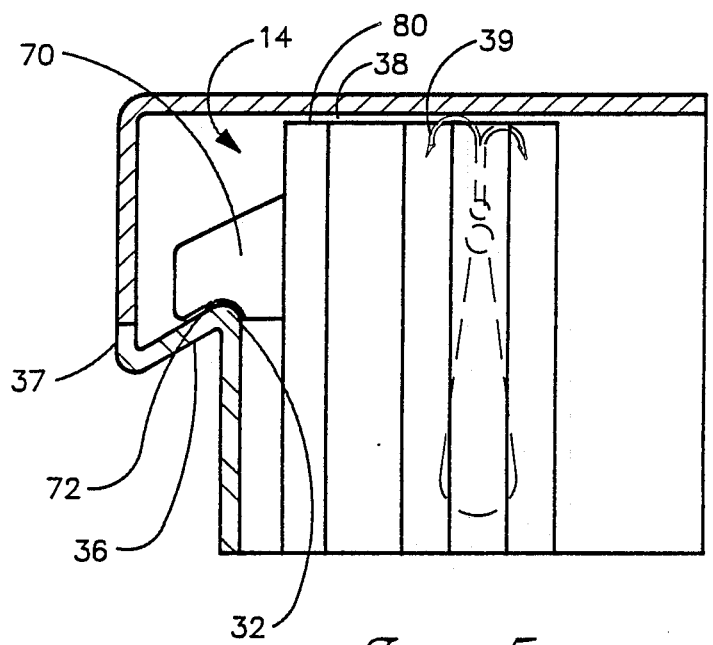
FIG. 5 is an enlarged cross sectional front elevation view of a portion of FIG. 4.

Referring now to FIGS. 4 and 5, mounting means are provided for mounting and aligning the movable corrugated partitions 40 on the siderails 32, 34 of the base portion 12. In the illustrative embodiment of the invention shown in FIGS. 1-7, the mounting means comprises notched out tab portions 70 formed on each end of each partition 40. Each tab portion 70 is formed with a radiused concave notch 72 sized to engage the radiused convex edge of a complementary shape of the siderails 32, 34 of the base portion 12 and maintain the alignment of the partitions 40 with respect to one another. Each corrugated partition 40 in effect hangs or is suspended from its notched tab portion 70 on the siderails 32, 34 of the base portion 12. As is apparent, this arrangement allows each partition 40 to be moved transversely front to rear along the siderails 32, 34. Each partition can thus be shifted from a closed position in which the tackle storage cells 42 between adjacent abutting partitions 40 are closed to an open position in which the tackle storage cells between adjacent partitions 40 are open with the space between the adjacent partitions 40 increased for viewing and selectively removing fishing lures 44 on a partition 40. This construction also permits ready removal and replacement of each partition from the supporting rails as required.

As shown in FIG. 3, the sizing of the base portion 12 is such that the end partition 40, adjacent the front wall 18, may be moved away from abutment with its adjacent partition 40 to open the storage cells between the adjacent frontmost pair of partitions. This, as previously stated, provides an open position between the partitions for viewing or removing the individual fishing lures 44 from a partition 40. This movement may be repeated with the remaining adjacent abutting pairs of partitions 40 for access to the contents of all the individual tackle storage cells 42. The front 18 and rear 20 walls of the base portion 12 function as a stop means for limiting this transverse movement along the rails. The cover 16 of the base portion 12 may be provided with a partition displacement means such as a wedge-like insert 74 (FIG. 6) that contacts the frontmost partition 40 and moves all of the corrugated partitions 40 into abutting engagement with one another when the cover 16 is closed. With this construction the rear wall 20 of the base portion 12 functions as a stop means for stopping and limiting the transverse movement of the partition 40.

In use of the tackle holder 10, fishing lures 44 or other tackle can be hung or suspended by their hook or hooks from the top edges 80 of the partitions 40 with each lure 44 contained within an individual tackle storage cell 42. The partitions 40 are preferably sized to provide a tackle storage cell 42 depth that allows a variety of lures and other fishing tackle to freely hang within a storage cell 42 without touching the bottom 16 of the tackle holder 10. In general, each lure can be suspended from the edge 80 of a partition by a single barb of a hook 39.

Figure 12:
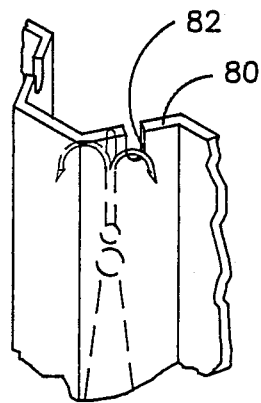
FIG. 12 is an enlarged perspective view of a portion of the top edge of a corrugated three-sided partition provided with notches in two sides constructed in accordance with one embodiment of the invention.

Alternately, as shown in FIG. 12, hooking means for attaching the individual lures 44 to a partition 40 by their hooks may be provided in the form of hook slots 82 formed in the top edges 80 of the partitions 40. Multiple slots 82 may be formed on opposite wave surfaces of a partition 40. As previously explained and as shown in FIG. 12, each lure can be hooked to a slot 82 by a single barb of a hook. For the three sided arrangement shown in FIG. 12, the slot 82 is in each inclined side and one hook of a treble hook arrangement is preferably placed in this slot as shown.

Figure 13:
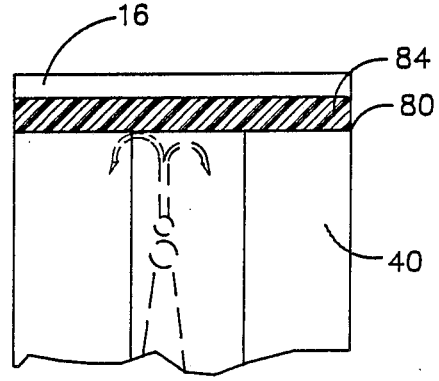
FIG. 13 is a partial enlarged side elevation view of a top edge of a corrugated partition and a cover carrying a resilient layer constructed in accordance with one embodiment of the invention.

Alternately, as shown in FIG. 13, the hooking means may further comprise a resilient or compressible layer of material 84 attached to the inside of the cover 16 of the tackle holder 10. The resilient layer 84 functions to engage the top edges 80 of the partitions 40 when the cover 16 of the base portion 12 is closed over the storage section 14. This arrangement helps to secure the hooks of the lures 44 to the top edge 80 of the partitions 40 and further to cover the top of tackle storage cells 42 and prevent the lures 44 from falling out of the storage cells 42 if the tackle container 10 should be jostled or upended.

Referring now to FIG. 14, an alternate embodiment of a tackle holder 89 embodying features of the present invention is shown. In the alternate embodiment, the base portion 90 of the tackle holder 10 is fabricated as an open framework rather than as a closed box-like container. In this embodiment the open framework base portion 90 is mountable in another larger tackle box. The larger box may be formed with an opening that just accommodates the base portion 90 and covers the top of the individual tackle storage cells 42.

The base portion 90 is generally rectangular in shape and includes spaced, opposed front and rear braces 92, 93 and spaced, opposed sidewalls 94, 96. All of these components are attached to one another at the ends to form a rigid open frame-like structure. The top edges 102, 104 of the sidewalls 94, 96 of the base portion 90 are parallel and spaced at a distance to provide the siderails for mounting a plurality of individual corrugated partitions 40 as previously explained.

Figure 15:
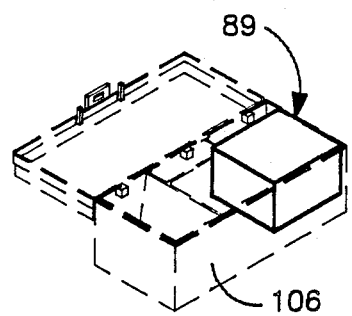
FIG. 15 is a schematic view of a tackle holder constructed in accordance with the invention shown in FIG. 14 and shown as placed into a larger tackle box with a hinged cover.
Figures 16, 17:
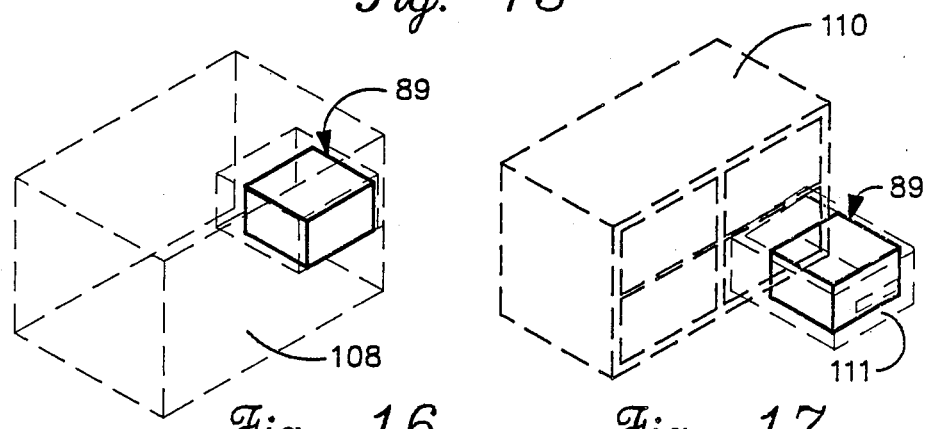
FIG. 16 is a schematic view of a tackle holder constructed in accordance with the invention shown in FIG. 14 and shown as slid into an opening in a larger tackle box.
FIG. 17 is a schematic view of a tackle holder constructed in accordance with the invention shown in FIG. 14 and shown as placed into a larger tackle box with a slide out drawer.

With this arrangement, the entire tackle holder 89 with partitions 120 attached, may be slid into and out of a larger fishing tackle box. The larger fishing tackle box may be provided with a storage space for the tackle holder 89 that is sized to abut and engage the holder 89 and the top edge of the corrugated partitions 120 to close the tackle storage cells 122 and prevent the fishing lures 44 from falling out of the storage cells 122. As shown in FIG. 15 in schematic form, the tackle holder 89 may be placed into a tackle box 106 with a lid. Alternately, as shown in FIG. 16, the tackle holder 89 may be slid into an opening in the side of a tackle box 108. Finally, as shown in FIG. 17, the larger tackle box 110 may be provided with a slidable drawer 111 for the tackle holder 89.

In the alternate embodiments shown in FIGS. 15-17, hooking means for attaching the lures 44 to the partitions 120 may again include hook slots in the partitions 120 as previously explained.

Thus, the invention provides a tackle holder in which fishing lures or other tackle can be separated and stored in individual tackle storage cells. Since complete separation of the lures across their entire length is maintained, the lures do not become entangled. In addition, the lures are securely fastened to the movable corrugated partitions by the hooking means of the invention and cannot fall out of the storage cells even if the tackle container is tipped or jostled. Moreover, individual partitions with lures attached can be easily moved away from one another and lifted from the tackle container for viewing the lures and for selectively removing and securing individual lures.

Although the present invention has been described with a certain degree of particularity, it is understood that the present disclosure has been made by way of example and that changes in details of structure may be made without departing from the spirit thereof.

What is claimed is:

1. A fishing tackle holder comprising:
   base means,
   tackle storage means defining a plurality of rows of tackle storage cells, said tackle storage means including a plurality of partitions,
   each of said partitions being generally corrugated having a series of alternating ridges,
   said partitions being arranged in opposite pairs and arranged with one set of ridges of said opposite pairs extending away from one another and another set of ridges of said opposite pairs extending toward one another to form said storage cells, and
   each of said partitions having an edge portion for engaging at least one hook of a fishing tackle member to support said member in a suspended manner in an associated one of said storage cells.

2. A fishing tackle holder as defined in claim 1 wherein each of said partitions is supported for a generally aligned guided movement by said base means in a direction generally transversely of said partitions between a closed and an open position.

3. A fishing tackle holder as defined in claim 1 wherein said another set of ridges of said opposite pairs abut against one another along a parting line between adjacent partitions to separate each cell in each associated row, said parting line being the longitudinal center line for the cells in that row.

4. A fishing tackle holder as defined in claim 1 wherein adjacent rows of said tackle storage cells are offset from one another along said rows.

5. A fishing tackle holder as defined in claim 1 wherein said base means includes a pair of opposite guide rails from which said partitions are suspended and by which said partitions are guided.

6. A fishing tackle holder as defined in claim 5 and wherein each of said partitions is suspended from said guide rails on tab portions each with a notch at each end of each of said partitions, which said guide rails enable said partitions to be readily removed.

7. A fishing tackle holder as defined in claim 1 and further including a cover arranged to cover the top of said tackle storage cells and disposed to retain said hook on said edge portion thereby retaining the associated member in an associated one of said, cells.

8. A fishing tackle holder as defined in claim 7 wherein there is a gap of a selected dimension between said cover and said edge portions so that said cover engages and compresses said hook between said cover and said edge portion to secure said hook to the associated partition.

9. A tackle holder as defined in claim 7 and further including a compressible layer attached to the inside of said cover for engaging said hook to secure said hook t the associated partition.

10. A fishing tackle holder as defined in claim 1 and wherein the base means includes a box-like container having a base portion open at the top with a cover for said base portion arranged to move between an open position and a closed position to cover the top of said base portions and said storage cells.

11. A fishing tackle holder as set forth in claim 10 wherein said base portion includes a front wall, rear wall, spaced sidewalls and a bottom, a flange portion extending laterally out from the top of said sidewalls to form a pair of guide rails for slidably supporting said partition and also provide pickup handles for said container.

12. A fishing tackle holder as defined in claim 1 and wherein at least one hook notch is formed on said edge portion sized to slidably receive said hook of said fishing tackle member to retain said hook at a selected position on an associated of said partitions.

13. A fishing tackle holder as defined in claim 1 and wherein said base means is an open framework adapted to be mounted in a larger fishing tackle box.

14. A fishing tackle holder as defined in claim 13 wherein said framework includes a pair of spaced, opposed braces and a pair of spaced, opposed sidewalls attached to one another at the ends, the top edge portions of said sidewalls forming said pair of opposite guide rails from which said partitions are suspended and by which said partitions are guided, the bottom edge portions of said sidewalls providing the base for supporting said framework in a larger tackle box.

15. A fishing tackle holder as defined in claim 1 and wherein each of said partitions is formed with ridges having a side parallel to but spaced from the longitudinal center line of the partition and two inclined sides arranged to form generally hexagonal-shaped storage cells.

16. A fishing tackle holder as set forth in claim 15 including a hook notch on each of said edge portions of each of said two inclined sides, each hook notch sized to slidably receive a hook to retain said hook at a selected position in an associated of said partitions.

17. A fishing tackle holder as defined in claim 1 and wherein each of said partitions has two-sided generally triangular ridges to form generally double triangular shaped storage cells.

18. A fishing tackle holder as set forth in claim 1 wherein each of said partitions has three-sided ridges to form four-sided storage cells.

19. A fishing tackle holder as defined in claim 1 and wherein each of said partitions is formed with semicircular shaped ridges to form generally circular shaped storage cells.

20. A fishing tackle holder as defined in claim 1 and wherein each of said partitions is formed with generally sinusoidal-shaped ridges to form generally double sinusoidal-shaped storage cells.

21. A fishing tackle holder as defined in claim 1 wherein opposite pairs of said partitions are identical in construction with one another with one of each pair facing in an opposite direction with respect to the other of each pair so as to be mirror image of the other.

22. A fishing tackle holder comprising:
   a base having a pair of spaced rail portions and stop means at the ends of said rail portions,
   a cover associated with said base arranged to move between an open and closed position, at least one pair of generally corrugated first and second partitions movably mounted to said rail portions and disposed opposite to one another to form a series of tackle storage cells along said partitions, each of said partitions having a series of alternating ridges and grooves, each of said ridges alternately projecting to opposite sides of a longitudinal center line of said ridges of each partition, one of said partitions being longitudinally offset relative to the other of said partitions so that a first set of ridges of said first and second partitions extends in opposite directions away from one another to form a storage cell, and a second set of ridges of said first and second partitions extends in opposite directions toward one another to abut at a common longitudinal center line of said cells of each row, each of said partitions having mounting means for movably attaching the partitions to said rail portions for aligned guided movement of each of said partitions toward and away from one another between a closed position wherein said partitions abut one another and an open position for removal of a selected tackle member and wherein the extend of movement of said partitions is limited by said stop means, each of said partitions having a top edge portion for engaging at least one hook of a fishing tackle member to support said fishing tackle member in a suspended manner in an associated of said cells, and said cover being disposed in a selected spaced relation to said top edge portion in the closed position to retain said hook on said top edge portion and the associated tackle member in an associated cell.

23. A fishing tackle holder as set forth in claim 22 wherein said base is in the form of a container with a base portion including a front wall, rear wall, spaced side walls and a bottom, the upper edge portion of said sidewalls forming said rail portions, said front and rear walls forming said stop means.

24. A fishing tackle holder as defined in claim 22 and further including a partition displacement means associated with said cover for moving each of said partitions to said closed position when said cover is in a closed position.

25. A fishing tackle holder as defined in claim 24 wherein said partition displacement means is in the form of a wedge mounted on the inside of said cover.

26. A fishing tackle holder comprising:

a container including a base portion with a front wall, rear wall, spaced sidewalls and a bottom, said sidewalls having upper edge portions defining a pair of spaced opposite generally parallel guide rails extending laterally out from the top edges and terminating in an upturned lip, said container having a cover with a lower downturned lip arranged to move between an open and a closed position, the lower downturned lip of said cover fitting against said upturned lip in the closed position to close said container, a plurality of pairs of generally corrugated first and second partitions in said container with said first partition of each pair being a mirror image of said second partition of each pair and with said partitions being movably mounted to said rail portions and disposed opposite to one another to form a plurality of rows of tackle storage cells between said pair of partitions, each said partition having series of alternating ridges, each said ridge alternately projecting to opposite sides of a longitudinal center line if said ridges of each partition, adjacent rows of said tackle storage cells being longitudinally offset relative to the other of said partitions such that a first set of ridges of said first and second partitions of each pair extends in opposite directions away from one another to form a tackle storage cell, and a second set of ridges of said first and second partitions extends in opposite directions toward one another to abut at a common longitudinal center line of said cells of each row, each said partition having mounting means for movably supporting the partitions on said rail portions for aligned movement of either of said partitions toward and away from one another between a closed position wherein said partitions abut one another to an open position wherein said partitions are separated a select distance as established by the distance between said front and rear walls for removal of a selected tackle member and where the extent of movement of said partitions being limited by said front and rear walls, each said partition having an edge portion for engaging at least one hook of a fishing tackle member to support said fishing tackle member in a suspended manner in an associated of said cells, and said cover being disposed in relation to said edge portion in the closed position to retain said hook on said edge portion and an associated tackle member in an associated cell.

* * * * *